United States Patent
Monson et al.

(10) Patent No.: US 10,218,747 B1
(45) Date of Patent: Feb. 26, 2019

(54) LEVERAGING GEOGRAPHICALLY PROXIMATE DEVICES TO REDUCE NETWORK TRAFFIC GENERATED BY DIGITAL COLLABORATION

(71) Applicant: Microsoft Technology Licensing, LLC, Redmond, WA (US)

(72) Inventors: Aaron James Monson, Issaquah, WA (US); Ana Sofia Gonzalez Aguirre, Bellevue, WA (US); Daniel Bernardo Sierra, Kirkland, WA (US); Derrick Charles Wampler, Bothell, WA (US); Douglas James Lenox, Redmond, WA (US); Kelly Jean Graham, Seattle, WA (US); Kathleen Patricia Mulcahy, Seattle, WA (US); Laura Cabrera, Sammamish, WA (US); Timothy David Kviz, Seattle, WA (US); Tyler H. Pasch, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/914,871

(22) Filed: Mar. 7, 2018

(51) Int. Cl.
*G10H 1/00* (2006.01)
*H04L 29/06* (2006.01)
*H04L 29/08* (2006.01)

(52) U.S. Cl.
CPC ....... *H04L 65/1069* (2013.01); *G10H 1/0025* (2013.01); *G10H 1/0058* (2013.01);
(Continued)

(58) Field of Classification Search
CPC ........... G10H 2240/175; G10H 1/0058; G10H 2240/305; G10H 1/383; G10H 1/0025;
(Continued)

(56) References Cited

U.S. PATENT DOCUMENTS 6,482,087 B1 * 11/2002 Egozy ..................... A63F 13/12
463/42
7,297,858 B2 * 11/2007 Paepcke ............... G10H 1/0066
84/609

(Continued)

OTHER PUBLICATIONS

"Ejamming", Retrieved From <<http://www.ejamming.com/learn-more/>>, Retrieved on: Dec. 4, 2017, 5 Pages.
(Continued)

*Primary Examiner* — Jeffrey Donels
(74) *Attorney, Agent, or Firm* — Mike Cicero; Newport IP, LLC

(57) ABSTRACT

A system to identify and leverage geographically proximate client devices to reduce network traffic associated with facilitating digital collaboration sessions in a real-world environment. Embodiments enable a user to initiate a digital collaboration session and to limit participation in the digital collaboration session to client devices that are physically located within a geofence (e.g., a virtual geographic boundary). Other client devices that are located within the geofence are identified and enabled to join the digital collaboration session. participants may each use their own client device to contribute to the digital collaboration session. Participants can save individual segments of the digital collaboration session by indicating an interest immediately after the segments occur. Client devices then upload data for the segment for enhancement. Enhancing the segment includes adjusting a timing of at least some of the participants' contributions to more closely match an underlying rhythmic pattern of the segment of interest.

17 Claims, 8 Drawing Sheets

(52) U.S. Cl.
CPC ...... *H04L 65/1093* (2013.01); *H04L 67/1046* (2013.01); *H04L 67/18* (2013.01); *G10H 2220/101* (2013.01); *G10H 2240/175* (2013.01)

(58) Field of Classification Search
CPC .... G10H 1/368; G10H 1/40; G10H 2210/066; G10H 2210/105; G10H 2220/101; H04L 65/1069; H04L 67/1046; H04L 67/18; H04L 65/1093
USPC .................................................. 84/600, 610
See application file for complete search history.

(56) References Cited

U.S. PATENT DOCUMENTS

| | | | | |
|---|---|---|---|---|
| 7,820,902 | B2* | 10/2010 | Furukawa | G10H 1/0058 84/609 |
| 8,288,641 | B2 | 10/2012 | Wilson | |
| 8,962,964 | B2 | 2/2015 | Emmerson | |
| 8,983,829 | B2 | 3/2015 | Cook et al. | |
| 9,236,039 | B2* | 1/2016 | Katto | A63F 13/211 |
| 9,305,531 | B2* | 4/2016 | Miwa | G10H 1/0066 |
| 2003/0164084 | A1* | 9/2003 | Redmann | G10H 1/0058 84/615 |
| 2005/0150362 | A1* | 7/2005 | Uehara | G09B 15/00 84/645 |
| 2006/0123976 | A1* | 6/2006 | Both | G10H 1/0058 84/600 |
| 2007/0039449 | A1* | 2/2007 | Redmann | G10H 1/0058 84/609 |
| 2007/0223675 | A1* | 9/2007 | Surin | H04L 12/1827 379/202.01 |
| 2008/0190271 | A1* | 8/2008 | Taub | G10H 1/0058 84/645 |
| 2009/0106429 | A1 | 4/2009 | Siegal et al. | |
| 2009/0113022 | A1 | 4/2009 | Quoc et al. | |
| 2011/0273978 | A1* | 11/2011 | Murayama | H04L 12/4015 370/216 |
| 2011/0289208 | A1* | 11/2011 | Hara | H04L 12/1827 709/224 |
| 2013/0238999 | A1 | 9/2013 | Helms et al. | |
| 2015/0066780 | A1 | 3/2015 | Cohen et al. | |
| 2018/0097856 | A1* | 4/2018 | Dange | H04L 65/403 |

OTHER PUBLICATIONS

Pangburn, DJ, "Splice is building a collaborative tool for music production", Retrieved From <<https://www.theverge.com/2016/4/1/11349478/splice-beatmaker-samples-sequencing>>, Apr. 1, 2016, 4 Pages.

* cited by examiner

LEVERAGING GEOGRAPHICALLY PROXIMATE DEVICES TO REDUCE NETWORK TRAFFIC GENERATED BY DIGITAL COLLABORATION

BACKGROUND

Some music generation applications are designed to enable multiple remotely located users to join digital environments for sharing and collaborating toward creating musical compositions (e.g., tracks). Such applications include various tools for composing and/or mastering new tracks, arranging (e.g., re-conceptualizing) previously composed tracks, mixing multiple tracks together to generate new tracks, and other highly specialized musical functions. Musicians from around the globe come together in these digital environments to collaborate with one another and jointly create their own unique sounding tracks. Typically, multiple musicians each use their own client device to contribute to a musical composition by uploading their individual contributions into the digital environment and downloading other participants' contributions to their client device.

Musical collaboration in such digital environments can consume a large amount of computing resources. For example, uploading and downloading each of the participants' contribution streams at each participants' client device results in an exorbitant amount of network traffic. Also, due to network bandwidth limitations that are inherent to individual client devices, real-time collaboration (e.g., via a "jam session") is often infeasible because the network bandwidth that would be required to facilitate real-time collaboration in a purely digital environment exceeds the limited network bandwidth that is available to the individual client devices. Thus, the contributions of each participant are often affected by network latency, which delays the contributions (e.g., as compared to other contributions to the musical composition) and renders real-time collaboration practically impossible.

It is with respect to these considerations and others that the disclosure made herein is presented.

SUMMARY

The disclosed technologies include a system to identify and leverage geographically proximate client devices to reduce network traffic associated with facilitating digital collaboration sessions in a real-world environment.

Generally described, embodiments disclosed herein enable a user to initiate a digital collaboration session and to limit participation in the digital collaboration session to client devices that are physically located within a geofence (e.g., a virtual perimeter for a real-world geographic area). For example, a user may request initiation of a digital collaboration session from a client device. The disclosed system then sets a geofence for the digital collaboration session based on a location of the client device. Other client devices that are located within the geofence are identified and enabled to join the digital collaboration session. Joined participants may each use their own client device to contribute to the digital collaboration session. By virtue of participation being restricted by the geofence, the joined participants are within audible range of one another and, therefore, the participants' individual contributions are contributed into the digital collaboration session via audio output that is generated by speakers that are built into the participants' individual client devices.

When a participant likes a segment of the digital collaboration session, the participant can immediately thereafter indicate an interest in that segment of interest. Then, responsive to the indicated interest, the individual client devices are caused to upload data corresponding to the segment of interest to a digital collaboration service. The system can then enhance the segment of interest by adjusting a timing of at least some of the participants' contributions to, for example, more closely match an underlying rhythmic pattern of the segment of interest (e.g., a participant's contribution can be "snapped" closer to the segment's beat). Ultimately, an enhanced version of the segment of interest may be transmitted to the client device from which the interest was indicated.

Implementations of the techniques described herein reduce network traffic resulting from a digital collaboration session by limiting the amount of data that is uploaded and/or downloaded in association the digital collaboration session. For example, rather than indiscriminately uploading and downloading all digital content that is generated during a digital collaboration session, according to the techniques described herein only that digital content for which a participant has indicated an interest in is transmitted over a network. Specifically, according to various implementations, a participant may express an interest in a segment of the digital collaboration session by tapping a user interface (UI) element immediately after the segment has occurred. Then, responsive to the indicated interest (e.g., the tapping of the UI element), an amount of data that is limited to that segment may be transmitted over a network for storage and/or enhancement as described herein. Other data that does not correspond to the segment of interest may be discarded without ever having been transmitted over the network.

Implementations of the techniques described herein mitigate latency issues that render real-time collaboration impractical under typical networking circumstances (e.g., wherein network bandwidth is a limited resource). For example, rather than continuously streaming each participants' contributions to each other participants' client device for audio output, according to the techniques described herein each participants' contributions are audibly played into the digital collaboration session from their respective client device's speakers without reliance on network transmission. Furthermore, each participant's contribution may be saved locally at their respective client devices and transmitted over a network only if a participant expresses interest in a particular segment. Therefore, regardless of the bandwidth capabilities of any available networks, digital collaboration sessions can occur in the form of real-time impromptu "jam sessions" without suffering from network latency issues that would otherwise result from bandwidth limitations.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter.

Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicates similar or identical items.

References made to individual items of a plurality of items can use a reference number followed by a parenthetical containing a number of a sequence of numbers to refer to each individual item. Generic references to the items may use the specific reference number without the sequence of numbers.

As used herein, the use of "N" within a parenthetical simply represents any value that is greater than one. Reference to multiple particular items as having "N" instances does not indicate that these items necessarily have the same number of instances.

DETAILED DESCRIPTION

Figure 1:
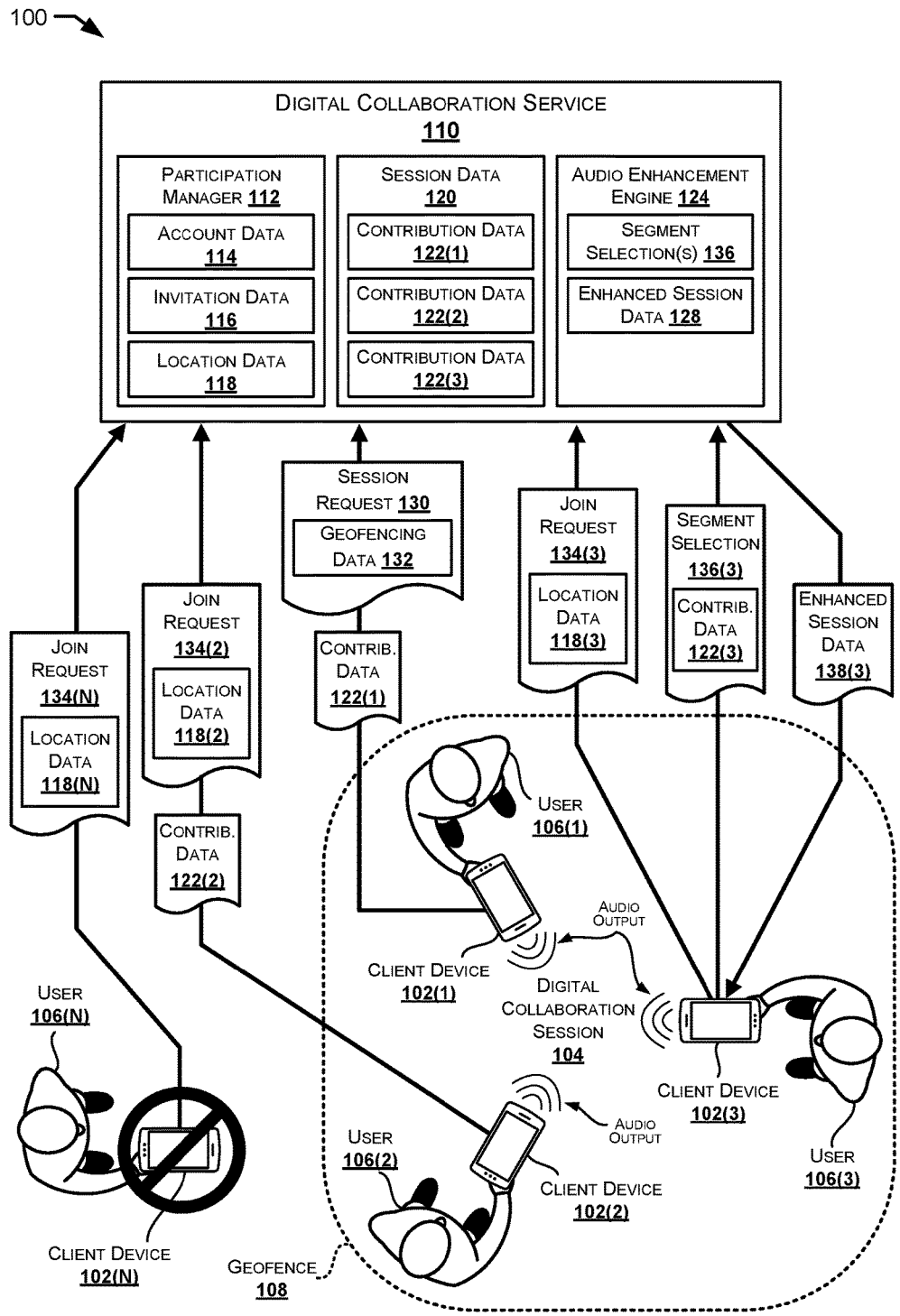
FIG. 1 shows an exemplary system for leveraging client devices that are geographically proximate to facilitate a digital collaboration session during which participants' contributions are audibly emitted from speakers of their respective client devices.

The following Detailed Description describes systems and methods for leveraging geographically proximate client devices to reduce network traffic associated with facilitating digital collaboration sessions in a real-world environment. Generally described, embodiments disclosed herein enable initiation of a digital collaboration session for which participation therein is restricted based on a geofence (e.g., a virtual perimeter for a real-world geographic area). For example, a geofence may be enforced with respect to a digital collaboration session and so that only client devices that are located within the geofence can be used to join the digital collaboration session. Users deploy client devices that are physically located within the geofence to join in (e.g., become participants of) and contribute to the digital collaboration session. Geofencing the digital collaboration session may ensure that the participants are within audible range of one another so that the participants' individual contributions can be effectively contributed into the digital collaboration session via audio output that is generated by the participants' individual client devices. Therefore, according to the techniques described herein, contributing to the digital collaboration session can be accomplished without transmitting data streams (e.g., that are generated based on the participants' individual contributions) indiscriminately over a network.

Upon hearing and liking particular segments of the digital collaboration session, participants can immediately thereafter indicate an interest in those segments of interest. Then, responsive to the indicated interest, the individual client devices are caused to transmit (e.g., upload to a digital collaboration service, transmit peer-to-peer between the client devices, etc.) a portion of data that corresponds to the segments of interest. These segments can then be enhanced by, for example, adjusting a timing of at least some of the participants' contributions to more closely match an underlying rhythmic pattern of the segment of interest. Stated alternatively, a participant's contribution can be "snapped" closer to the segment's beat. Ultimately, an enhanced version of the segment of interest may be transmitted to the client device from which the interest was indicated.

In an exemplary implementation, a system receives a session request that requests initiation of a digital collaboration session. The session request can include geofencing data that defines a geofence for the digital collaboration session. For example, a user can deploy a smartphone to generate the session request and the smartphone can affix its location to the session request. The session request may indicate other users to invite to participate in the digital collaboration session and the system may send invitations to these other users to inform them that the digital collaboration session has been initiated.

The system determines whether to allow individual client devices to join into the digital collaboration session based on specific locations of the individual client devices. For example, users may deploy individual client devices to generate join requests that request the ability to participate in the digital collaboration session. Individual client devices affix location data to corresponding join requests to inform the system as to whether each client device is within the geofence. If a client device is within the geofence the system may grant its join request, whereas if the client device is outside the geofence the system may deny its join request.

Client devices associated with granted requests are caused to display a contribution graphical user interface (GUI) that enables joined participants to use their respective client devices as instruments for participating in the digital collaboration session. The contribution GUI displays one or more user interface (UI) elements that a participant may tap and/or hold to play sounds from a client device's built-in speakers. In some implementations, the contribution GUI enables participants to dynamically swap out instruments and/or otherwise controllably modify a type of sound that is emitted by their respective client devices. For example, the contribution GUI may enable the participants to perform various input gestures (e.g., swipe right or left, swipe up or down, etc.) to quickly toggle between playing various instruments such as an electric guitar and an electronic synthesizer. Because each individual client device serves as an instrument which actually emits sounds via its built-in speakers, it can be appreciated that what each participant hears during the digital collaboration session is an aggregation of the contributions that audibly emitted out of each individual client device.

When a participant likes a segment of the digital collaboration session, that participant can indicate an interest in that segment to cause that segment to be saved for subsequent playback and/or enhancement. For example, the contribution GUI can include an interest UI element that the user may tap to indicate their interest in the segment. The segment may be defined as a predetermined duration of time that is measured backward from an instance in time when the participant indicated the interest in the segment. For example, upon tapping the interest UI element the system may save the immediately previous thirty ("30") seconds to provide to the interested participant.

In response to the participant indicating the interest in the segment, the system may generate enhanced session data that enables playback of an enhanced version of the segment of interest. For example, the system may determine a rhythmic pattern corresponding to the segment of interest. Based on the rhythmic pattern, the system may modify the timing between various individual sounds that occur during the segment of interest to enhance (e.g., "improve" or "polish") how that segment ultimately sounds when subsequently played back.

For illustrative purposes, consider a scenario in which the contributions of one or more participants generally follow a particular rhythmic pattern but include inadvertent deviations from this particular rhythm pattern. For example, a specific participant's contributions during the digital collaboration session may deviate from this particular rhythmic pattern in a manner that appears to result inadvertently due to this participant being musically inexperienced (e.g., the participant lacks rhythm and therefore struggles to hold a beat). Under these circumstances, the system may identify instances where this participant's contributions deviate from the particular rhythmic pattern and may adjust these instances to more closely match the particular rhythmic pattern. Thus, the enhanced version of the segment may be improved by aligning individual participants' contributions to one or more underlying rhythmic patterns of the segment. Then, the aligned contributions can be combined into a merged-track (e.g., an MP3 formatted track) that enables playback of the enhanced version of the segment of interest. In this way, participants are able to obtain shareable versions of impromptu jam sessions that are more polished sounding than how those impromptu jam sessions actually sounded in real-time.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual partitions and/or sub-portions of transactions and/or prefetch buffers may be distinguished by numerical designations without such designations corresponding to the claims or even other paragraphs of the Summary and/or Detailed Description. For example, any designation of "first contribution data" and "second contribution data" within a paragraph of this disclosure is used solely to distinguish two different instances of contribution data within that specific paragraph—not any other paragraph and particularly not the claims.

Implementations of the techniques described herein improve efficiencies with respect to a wide array of computing resources. With respect to network transmission resources, network traffic is reduced by limiting the amount of data that is uploaded and/or downloaded in association the digital collaboration session. For example, rather than indiscriminately uploading and downloading all digital content that is generated during a digital collaboration session, according to some embodiments described herein only that digital content for which a participant has indicated an interest in is transmitted over a network.

It can be appreciated that reducing network traffic on a physical network (e.g., reducing the number of blocks and/or packets of data that are transmitted through a point-to-point transmission medium) reduces energy consumption as well as processing cycles at each affected point (e.g., node) of the physical network. With respect to network bandwidth limitations, latency issues that render real-time collaboration impractical under typical networking circumstances (e.g., wherein network bandwidth is a limited resource) are mitigated by audibly playing each participants' contributions from their respective client devices. For example, rather than continuously streaming each participants' contributions to each other participants' client device for audio output, according to embodiments described herein each participants' contributions are audibly played in real-time from their respective client device's speakers without reliance on network transmission.

FIG. 1 shows an exemplary system 100 for leveraging client devices 102 that are geographically proximate to facilitate a digital collaboration session 104 during which participants' contributions are audibly emitted from speakers of their respective client devices 102. In this way, the digital collaboration session 104 can occur in the form of an impromptu "jam session" during which the participants' respective client devices 102 serve as instruments. As a specific but non-limiting example, a participant can tap a touchscreen of a smartphone to "jam out" with the other participants.

As illustrated, a first user 106(1) deploys a first client device 102(1) to generate a session request 130 that requests initiation of the digital collaboration session 104. The session request 130 is transmitted to a digital collaboration service 110 that is configured to initiate and manage participation in the digital collaboration session 104. Initiating the digital collaboration session 104 may include assigning identification information to the digital collaboration session 104. The identification information may enable the digital collaboration service 110 and/or the client devices 102 to distinguish the digital collaboration session 104 from other digital collaboration sessions that have been or will be initiated. Managing participation in the digital collaboration session 104 may include deploying a participation manager 112 to identify one or more other client devices 102 to associate with the digital collaboration session 104.

In some embodiments, the participation manager 112 may identify the one or more other client devices 102, to associate with the digital collaboration session 104, based on account data 114 that describes characteristics of various users 106. In one example, the account data 114 may include preferred musical genre information that indicates one or more genres of music that are preferred by individual users 106. Under these circumstances, the participation manager 112 may respond to receiving the session request 130 by accessing a portion of the account data 114 that corresponds to the first user 106(1) to identify a particular genre of music that is preferred by the first user 106(1).

The participation manager 112 may then identify one or more other users 106 that have preferences for the particular genre of music. The participation manager 112 may in some cases notify certain other users 106 of the digital collaboration session 104 that the first user 106(1) has requested initiation of based on these certain other users sharing common musical preferences with the first user 106(1). For example, upon receipt of the session request 130, the participation manager 112 may analyze the account data 114 to determine that the first user 106(1) prefers alternative rock-and-roll type music when listening to music via a streaming music service (e.g., SPOTIFY, etc.) and/or "jamming out" in digital collaboration sessions 104. Under these circumstances, the participation manager 112 may further analyze the account data 114 to identify certain other users that also have preferences for alternative rock-and-roll type music and, ultimately, to notify these other users (e.g., via text message, pop-up notification, or any other message type suitable for transmission to a client device) of the digital collaboration session that the first user 106(1) has requested initiation of.

In another example, the account data 114 may include social network information that indicates various social connections and/or relationships of various individual users 106. Under these circumstances, the participation manager 112 may respond to receiving the session request 130 by analyzing the account data 114 to identify one more other users that are socially connected to the first user 106(1). For example, the participation manager 112 may identify other users that are "friends" with the first user 106(1) in an online social network (e.g., FACEBOOK). Ultimately, the participation manager 112 may notify these other users 106 of the digital collaboration session that the first user 106(1) has requested initiation of.

In some embodiments, the participation manager 112 may identify the one or more other client devices 102 based on invitation data 116 that indicates one or more users 106 that the first user 106(1) would like to be invited to the digital collaboration session 104. For example, the first user 106(1) may expressly define an invitation list for the digital collaboration session 104 to restrict participation in the digital collaboration session 104 to a predefined group of users. This expressly defined invitation list can be affixed to the session request 130 and transmitted to the digital collaboration service 110 which then transmits notifications to respective client devices 102 of the one or more users 106 listed in the invitation list.

As another example, the first user 106(1) may define invitation rules that are usable by the participation manager 112 to identify one or more other users to notify of and/or invite to participate in the digital collaboration session 104 that corresponds to the session request 130. For example, the first user 106(1) may define an invitation rule to cause the participation manager 112 to identify friends of the first user 106(1) as indicated in social network information of the account data 114 and furthermore to poll client devices 102 of the identified friends for location data 118. Then, the user-defined invitation rule may trigger the participation manager 112 to inform (e.g., invite to participate in and/or notify of) any of these identified friends that are within a determinable geographic area (e.g., within a threshold distance of a geofence 108 as described below) of the digital collaboration session 104 corresponding to the session request 130.

In some embodiments, the participation manager 112 may limit participation in the digital collaboration session 104 based on a geofence 108 (e.g., a virtual geographic boundary). In the illustrated example, the session request 130 includes geofencing data 132 that indicates parameters for defining the geofence 108. Exemplary parameters include, but are not limited to, a radius around a specified location to construct the geofence 108, a user-defined boundary, or any other information suitable for defining a geographic boundary. Then, once the digital collaboration session 104 has been initiated, the geofence 108 may be enforced such that a particular client device 102 being physically located within the geofence 108 is a requisite condition for using that particular client device 102 to join in and contribute to the digital collaboration session 104. Stated more plainly, client devices 106 that are currently inside of the geofence 108 can potentially be used (e.g., subject to other conditions if applicable) to join the digital collaboration session 104 whereas client devices 106 that are currently outside of the geofence 108 cannot be used to join the digital collaboration session 104.

In some implementations, the geofencing data 132 may indicate a location of the first client device 102(1) and the geofence 108 may be determined at least partially based on the location of the first client device 102(1). For example, responsive to the first user 106(1) generating the session request 130, the first client device 102(1) may perform one or more localization techniques and/or accessing a GPS module (not shown) to ascertain location data 118(1) indicating its geographic location. The first client device 102(1) may affix the location data 118(1) to the session request 130 to enable the digital collaboration service 110 to define and enforce the geofence 108 based on the location of the first client device 102(1). As a specific but non-limiting example, the location data 118(1) may define the location of the first client device 102(1) in terms of longitude and latitude (e.g., an absolute location). Then, the digital collaboration service 110 may set the geofence 108 at a predetermined radius (e.g., ten meters) around the location of the first client device 102(1).

In the illustrated example, subsequent to receiving the session request 130 from the first client device 102(1), the digital collaboration service 110 receives join requests 134 from one or more other client devices 102. In the illustrated example, each of a second user 106(2) through an $N^{th}$ user 106(N) deploy a respective client device 102 to transmit a respective join request 134 to the digital collaboration service 110. Each join request 134 requests an ability to join in and contribute to the digital collaboration session 104. For purposes of the present discussion, if a join request 134 that is sent by a particular user 106 is granted, then a client device 102 of that particular user 106 is enabled to facilitate participation in the digital collaboration session 104 (e.g., a contribution graphical user interface (GUI) as described below may become "unlocked" with respect to the client device).

In some embodiments, individual join requests 134 include corresponding location data 118 that indicates geographic locations for corresponding client devices 102. Based on the location data 118 received from a particular client device 102, the digital collaboration service 110 may determine a proximity of the particular client device 102 with respect to the geofence 108. The digital collaboration service 110 is enabled, therefore, to grant those join requests 134 that are received from client devices 102 that are within the geofence 108 and to deny other join requests 134 that are received from client devices 102 that are outside of the geofence. In some embodiments, the digital collaboration service 110 may respond to a join request 134 that is received from a client device 102 that is located outside of but geographically proximate to the geofence 108 (e.g., within a threshold distance from the geofence 108) with a notification that although the join request 134 is currently denied, moving into the geofence 108 and resending the join request 134 would result in being granted participation in the digital collaboration session 104.

In the illustrated example, each of the second client device 102(2) through the $N^{th}$ client device 102(N) are shown to transmit corresponding join requests 134 to the digital collaboration service 110. Each join request 134 illustrated in FIG. 1 further includes an instance of corresponding location data 118. Specifically, the second join request 134(2) includes second location data 118(2) that indicates a current location of the second client device 102(2), the third join request 134(3) includes third location data 118(3) that indicates a current location of the third client device 102(3), and the $N^{th}$ join request 134(N) includes $N^{th}$ location data 118(N) that indicates a current location of the $N^{th}$ client device 102(3). In the illustrated example, the first client device 102(1) was used to initiate the digital collaboration session 104 and, therefore, has been "joined" into the digital collaboration session 104 automatically without having to send a corresponding join request 134.

Under the circumstances illustrated in FIG. 1, the second join request 134(2) and the third join request 134(3) have been granted by the digital collaboration service 110 due to the second client device 102(2) and the third client device 102(3) being located within the geofence 108. As a result, the second client device 102(2) and the third client device 102(3) are enabled to facilitate participation in the digital collaboration session 104. In FIG. 1, each of the first user 106(1) through the third user 106(3) have successfully joined the digital collaboration session 104.

In contrast to the second and third client devices, the $N^{th}$ client device 102(N) is located outside of the geofence which results in the $N^{th}$ join request 134(N) being denied by the digital collaboration service 110 (as represented by the cross-symbol being shown over the $N^{th}$ client device 102(N)). Therefore, under the circumstances illustrated in FIG. 1, each of the first user 106(1) through the third user 106(3) have successfully become participants of the digital collaboration session 104 whereas the $N^{th}$ user has been denied participation in the digital collaboration session 104 due to being located outside of the geofence 108.

Since the "participants" of the digital collaboration session 104 include only the first user 106(1) through the third user 106(3), this group of users is provided with an ability to generate contribution data 122 in association with the digital collaboration session 104. For example, a contribution GUI as described in more detail below may be "unlocked" at the respective client devices 102 of the first user 106(1) through the third user 106(3) to facilitate generation of contribution data 122 that causes audio output to be generated in real-time. As a specific but non-limiting example, the "unlocked" contribution GUIs may enable each of the first user 106(1) through the third user 106(3) to tap a touchscreen of their respective client device 102 to play audio output directly from their respective client device 102—without discriminably transmitting the generated contribution data 122 over one or more networks.

In various implementations, the contribution GUI displays one or more user interface (UI) elements that a participant may tap and/or hold to play sounds from a client device's built-in speakers. The contribution GUI may also enable participants to dynamically swap out instruments and/or otherwise controllably modify a type of sound that is emitted by their respective client devices. For example, the contribution GUI may enable the participants to perform various input gestures (e.g., swipe right or left, swipe up or down, etc.) to quickly toggle between playing various instruments such as an electric guitar and an electronic synthesizer. Because each individual client device serves as an instrument which actually emits sounds via its built-in speakers, it can be appreciated that what each participant hears during the digital collaboration session is an aggregation of the contributions that audibly emitted out of each individual client device.

In some implementations, remaining a participant of the digital collaboration session 104 may be contingent upon remaining located within the geofence 108. For example, the digital collaboration service 110 may continually or periodically poll individual ones of the client devices 102 for "up-to-date" location data 118. As instances of the "up-to-date" location data 118 are received, the digital collaboration service 110 may determine whether to continue to permit individual client devices 102 to be used to participate in the digital collaboration session 104. For example, a particular client device 102 might be used to send a join request 134 at a time when the particular client device 102 is located within the geofence 108 which results in the digital collaboration service 110 granting the join request 134.

Granting the join request 134 may include enabling the particular client device 102 to display a contribution GUI as described herein. Subsequent to the join request 134 being granted, the digital collaboration service 110 might poll the particular client device 102 for "up-to-date" location data 118. Based on the "up-to-date" location data 118 indicating that the particular client device 102 has been moved from inside the geofence 108 to the outside of the geofence 108, the digital collaboration service 110 may terminate an ability of the particular client device 102 to be used to participate in the digital collaboration session 104. For example, the particular client device 102 may be caused to stop displaying the contribution GUI. As another example, the particular client device 102 may be caused to stop generating audio output responsive to user input receive via the contribution GUI (e.g., the contribution GUI may remain visible but may be disabled while the particular client device 102 is outside of the geofence 108).

During the digital collaboration session 104 the participants thereof may be enabled to generate a segment selection 136 to indicate an interest in a segment of the digital collaboration session 104. In some implementations, the segment selection 136 may be generated responsive to a user 106 tapping a predetermined user interface (UI) element. As a specific but non-limiting example, the contribution GUI described herein may include an "interest" UI element to enable users to quickly indicate an interest in various segments without interrupting the user's ability to contribute to the digital collaboration session 104. In some implementations, the segment may be defined as a predetermined duration of time that is measured backward from a moment at which the participant indicated the interest in the segment (e.g., by generating the segment selection 136). For example, generating the segment selection 136 may cause the system to save the immediately previous thirty ("30") seconds to provide to the interested participant.

In some implementations, generation of the segment selection 136 may cause instances of the contribution data 122 corresponding to each "joined" client device 102 to be combined into session data 120 that enables playback of the segment of interest. For example, under circumstances in which an individual user 106 has indicated an interest in a thirty ("30") second segment of the digital collaboration session 104, each "joined" client device 102 may be caused to provide a portion of contribution data 122, that corresponds to at least the thirty second segment of interest, to the digital collaboration service 110 and/or directly to the particular client device 102 from which the interest was indicated (e.g., using WIFI-direct, or any other suitable technology for peer-to-peer data transfer).

In the illustrated example, the third user 106(3) is shown to have generated a corresponding segment selection 136(3) which is transmitted by the third client device 102(3) to the digital collaboration service 110. Responsive to the segment selection 136(3), each of the first client device 102(1) through the third client device 102(3) are caused to provide an instance of contribution data 122 corresponding to the segment of interest to the digital collaboration service 110. For example, as illustrated, the third client device 102(3) transmits a third instance of contribution data 122(3) to the digital collaboration service 110 along with the segment selection 136(3). Then, upon receipt of the segment selection 136(3), the digital collaboration service 110 instructs the first client device 102(1) to provide a first instance of contribution data 122(1) and the second client device 102(2) to provide a second instance of contribution data 122(2).

The multiple instances of the contribution data 122 that are received from each of the different "joined" client devices 102 are then combined to create the session data 120 which enables playback of at least the segment of interest. In some implementations, session data 120 that enables playback of a particular segment of interest is provided to a particular client device 102 that was used to indicate the interest in the segment of interest. For example, upon a user 106 deploying a particular client device 102 to indicate an interest in a thirty second segment of the digital collaboration session 104, session data 120 that enables playback of that thirty second segment may be generated (e.g., by compiling appropriate instances of the contribution data 122). Then, the generated session data 120 may be ultimately provided to the particular client device 102 used to indicate the interest in the thirty second segment.

It can be appreciated that since the $N^{th}$ client device 102(N) is not a "joined" client device in scenario illustrated in FIG. 1, corresponding contribution data 122 is not collected and/or compiled into the session data 120 in response to the selection data 136. Thus, whatever the $N^{th}$ user 106(N) is doing with the respective $N^{th}$ client device 102(N) is immaterial to the resulting session data 120 (or enhanced session data 138 as described below for that matter).

In some embodiments, the digital collaboration service 110 may include an audio enhancement engine 124 for generating enhanced session data 128 that enables playback of an enhanced version of the segment of interest. As a specific example, the audio enhancement engine 124 may analyze the session data 120 to determine a rhythmic pattern corresponding to the segment of interest. Then, based on the identified rhythmic pattern, the audio enhancement engine 124 modify one or more timings between various individual sounds that occur during the segment of interest to enhance (e.g., "improve" or "polish") how that segment ultimately sounds when subsequently played back. In some embodiments, instances of the enhanced session data 128 may be individually generated for specific users based on any segment selections 136 received from those specific users. For example, as illustrated in FIG. 1, an instance of enhanced session data 138(3) is generated specifically for and provided to the third client device 102(3) in response to the third user 106(3) indicating an interest in a specific segment of the digital collaboration session 104. Thus, the enhanced session data 138(3) enables playback of an enhanced version of the specific segment.

For illustrative purposes, consider a scenario in which the contributions of one or more participants generally follow a particular rhythmic pattern but include inadvertent deviations from this particular rhythm pattern. For example, a specific participant's contributions during the digital collaboration session may deviate from this particular rhythmic pattern in a manner that appears to result inadvertently due to this participant being musically inexperienced (e.g., the participant lacks rhythm and therefore struggles to hold a beat). Under these circumstances, the system may identify instances where this participant's contributions deviate from the particular rhythmic pattern and may adjust these instances to more closely match the particular rhythmic pattern. Thus, the enhanced version of the segment may be improved by aligning individual participants' contributions to one or more underlying rhythmic patterns of the segment. In this way, participants are able to obtain shareable versions of impromptu jam sessions that are more polished sounding than how those impromptu jam sessions actually sounded in real-time.

In various implementations, the session data and/or the enhanced session data 138 may be generated in accordance with a standard format to enable playback on a multitude of computing applications and/or to enable sharing via social media platforms. For example, the enhanced session data 138 may be provided to the client devices 102 in a digital multimedia container format such as MP3, MP4, etc.

Figure 2A:
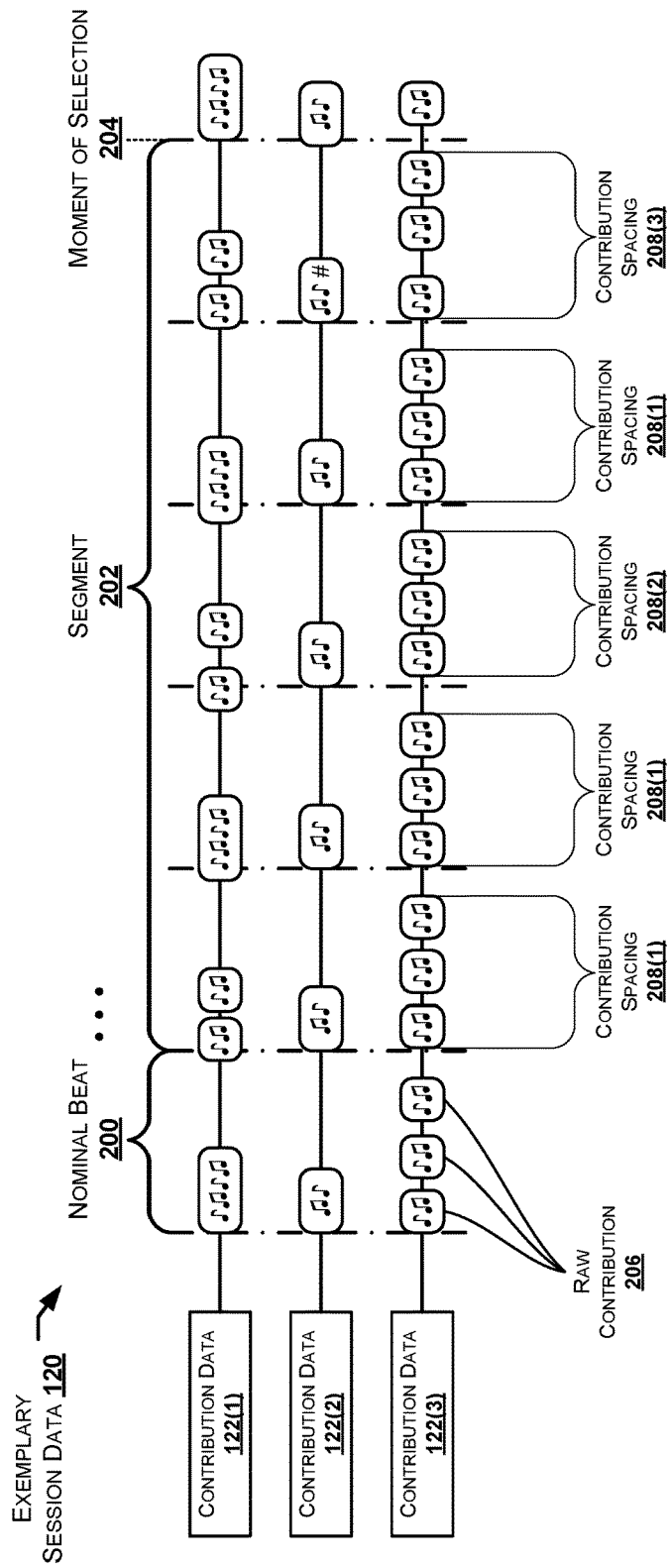
FIG. 2A illustrates exemplary session data in which multiple instances of contribution data that defines raw contributions of individual participants are compiled together.

Turning now to FIG. 2A, exemplary instances of contribution data 122 are illustrated as being compiled to form exemplary session data 120. More specifically, the exemplary session data 120 is generated by combining first through third instances of contribution data 122. The individual instances of contribution data 122 span in time over at least the segment 202 of interest. The segment 202 of interest may be defined as a predetermined amount of time that is measured backwards from a moment of selection 204 (e.g., a moment at which a user taps an "interest" UI to generate the selection data 136).

For purposes of the present discussion, the individual instances of contribution data 122 define raw contributions 206 that were previously made by individual participants during the digital collaboration session 104. Here, each individual raw contribution 206 illustrated in FIG. 2A represents a sound that was emitted in real-time during the digital collaboration session 104 responsive to a corresponding user 106 using their respective client device 102 as an instrument.

Figure 2B:
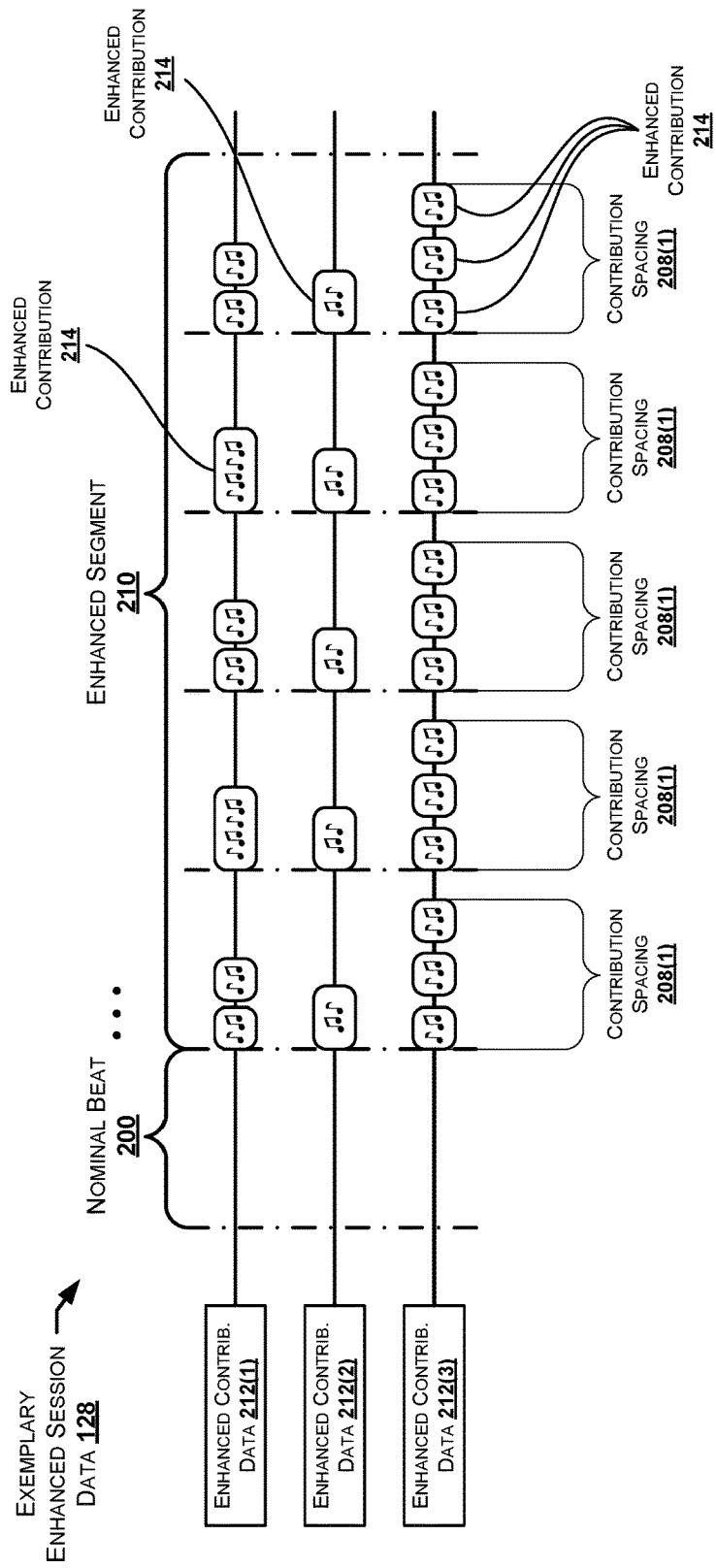
FIG. 2B illustrates exemplary enhanced session data in which one or more of the raw contributions of FIG. 2A have been modified to generate one or more enhanced contributions.

To reduce illustrative clutter FIGS. 2A and 2B, the raw contributions 206 are not each individually labeled but are rather shown as blocks of various durations each with one or more musical note symbols (e.g., "♪♫") illustrated thereon. The illustrated sizes of the individual raw contributions 206 roughly indicates a duration of the individual raw contributions 206. The illustrated positions of the individual raw contributions 206 with respect to other raw contributions 206 roughly indicates a timing of the individual raw contributions 206 with respect to the other raw contributions 206.

As illustrated in FIG. 2A, the first contribution data 122(1) indicates that during the segment 202 of interest a first user 106(1) was contributing to the digital collaboration session 104 by repeating a pattern of one relatively long contribution followed a succession of two relatively shorter contributions. Furthermore, the beginning of the relatively long contributions (i.e., represented with four music notes as follows ♪♫♫) and the succession of two relatively shorter contributions (i.e., represented with four music notes as follows ♫♪) each roughly coincide with a nominal beat 200.

As further illustrated, the raw contributions 206 of the first user 106(1) include slight deviations from one pass of the pattern to the next. For example, the first and fourth "long" contribution begin substantially on the nominal beat 200 whereas each of the second and third "long" contribution begin slightly prior to the nominal beat 200. Stated alternatively, at least some of the raw contributions 206 of the first user 106(1) are noticeably "off-beat" as compared to a nominal beat 200.

As further illustrated in FIG. 2A, the second contribution data 122(2) indicates that during the segment 202 of interest a second user 106(2) was contributing to the digital collaboration session 104 by repeating a pattern of a single contribution that begins coinciding closely with the nominal beat 200. For purposes of the present discussion, suppose that each raw contribution made by the second user 106(2) is substantially identical in pitch with the exemption of the last raw contribution 206 made during the segment 202 which is noticeably higher pitched (as indicated by the inclusion of the "♯" symbol) than the other raw contributions 206. Stated alternatively, at least some of the raw contributions 206 of the second user 106(2) are noticeably "off-pitch" as compared to a pitch (e.g., an average pitch of the first four raw contributions 206 of the second user 106(2)).

As further illustrated in FIG. 2A, the third contribution data 122(3) indicates that at various times during the segment 202 the third user 106(3) made raw contributions 206 that deviated from a discernable contribution spacing 208. It can be appreciated from FIG. 2A that the raw contributions 206 of the third user 106(3) generally follow a pattern of three successive contributions of equal duration within each measure of the nominal beat 200. In the illustrated example, the first, second, and fourth individual passes of the pattern that occur within the segment of interest closely follow a first contribution spacing 208(1). However, the third individual pass of the pattern follows a second contribution spacing 208(2) that is shorter than the first contribution spacing 208(1) whereas the fifth individual pass of the pattern follows a third contribution spacing 208(3) that is longer than the first contribution spacing 208(1). Thus, the third contribution data 122(3) indicates that although the third user 106(3) intended to repetitively generate the pattern in accordance with the first contribution spacing 208(1), the third user 106(3) inadvertently deviated from this "nominal" (e.g., intended) contribution spacing. Stated alternatively, at least some of the raw contributions 206 of the third user 106(3) are noticeably "off-tempo" as compared to a nominal tempo (e.g., which may be discernable based on one or more contribution spacings 208). The exemplary session data 120 that corresponds to any particular segment 202 of interest may be provided to whichever user 106 indicated that the interest in that particular segment 202 to enable unedited playback of the particular segment 202 of interest.

Turning now to FIG. 2B, exemplary enhanced session data 128 is illustrated in which one or more raw contributions 206 have been modified to generate one or more enhanced contributions 214. For example, as described in relation to FIG. 2A, various raw contributions 206 may deviate from one or more discernable characteristics such as being, for example, "off-beat" as compared to a nominal beat 200, "off-pitch" as compared to an average pitch of similar raw contributions 206, and/or being "off-tempo" as compared to a nominal tempo. According to the techniques described herein, raw contributions 206 that deviate from one or more discernable characteristics may be manipulated to generate corresponding enhanced contributions 214.

As illustrated in FIG. 2B, the exemplary enhanced session data 128 may include first enhanced contribution data 212(1) that corresponds to the first contribution data 122(1) of FIG. 2A and for which the timing of one or more raw contributions 206 has been adjusted with respect to the nominal beat 200. For example, the audio enhancement engine 124 may analyze the session data 120 to identify the nominal beat 200 and to further identify a pattern of the raw contributions 206 within the first contribution data 122(1). The audio enhancement engine 124 may further determine a nominal timing of the identified pattern with respect to the nominal beat 200.

For purposes of the present discussion, presume that the audio enhancement service 124 has identified that both of the relatively long contributions and the succession of the two relatively shorter contributions each correspond to a nominal timing that begins on the nominal beat 200. Thus, as illustrated in FIG. 2B, the timings of the raw contributions 206 from the first user 106(1) have been adjusted to align with (e.g., begin precisely at) the nominal beat 200. Thus, it can be appreciated that in some implementations generating the enhanced session data 128 may include repositioning a particular user's "off-beat" contributions with respect to an identifiable nominal beat 200.

As further illustrated in FIG. 2B, the exemplary enhanced session data 128 may include second enhanced contribution data 212(2) that corresponds to the second contribution data 122(2) of FIG. 2A and for which the pitch of one or more raw contributions 206 has been adjusted (e.g., to more closely match other raw contributions 206). For example, the audio enhancement engine 124 may analyze the session data 120 to identify the nominal pitch of one or more contributions of the second user 106(2) during the digital collaboration session 104.

The audio enhancement engine 124 may further identify at least one raw contribution 206 that is "off-pitch" with respect to the identified nominal pitch of the one or more other raw contributions 206. Then, the "off-pitch" contribution can be adjusted and/or replaced to more closely match the identified nominal pitch. For example, as illustrated, the fifth contribution of the second enhanced contribution data 212(2) has been replaced with a copy of one of the other raw contributions 206 that closely matches the nominal pitch. Thus, it can be appreciated that in some implementations generating the enhanced session data 128 may include re-pitching a particular user's "off-pitch" contributions with respect to an identifiable nominal pitch.

As further illustrated in FIG. 2B, the exemplary enhanced session data 128 may include third enhanced contribution data 212(3) that corresponds to the third contribution data 122(3) of FIG. 2A and for which the spacing of one or more raw contributions 206 has been adjusted. For example, the audio enhancement engine 124 may analyze the session data 120 to identify one or more contribution spacings 208. The audio enhancement engine 124 may further identify at least one contribution spacing that is "off-tempo" with respect to an identified nominal contribution spacing. In some implementations, the nominal contribution spacing may correspond to a particular contribution spacing that is repeated in at least a substantially similar manner throughout the segment 202 of interest. For example, as illustrated in FIG. 2A, the third contribution data 122(3) corresponds to a pattern of raw contributions which typically follow a first contribution spacing 208(1)

Based on observing that an identifiable pattern of raw contributions 206 generally follows the first contribution spacing 208(1), the audio enhancement engine 124 may designate the first contribution spacing 208(1) as the nominal contribution spacing for the enhanced segment 210. Then, portions of the segment 202 of interest which deviate from this designated "nominal" contribution spacing can be modified to follow the "nominal" contribution spacing. For example, as illustrated in FIG. 2A, a third portion of the third user's contributions deviated from the nominal contribution spacing to a second contribution spacing 208(2) that was shorter than nominal. Furthermore, a fifth portion of the third user's contributions deviated from the nominal contribution spacing to a third contribution spacing 208(3) that was longer than nominal. Accordingly, in the illustrated example, both of the third portion and the fifth portion have been adjusted in the enhanced segment 210 to correspond to the designated "nominal" contribution spacing.

Figure 3:
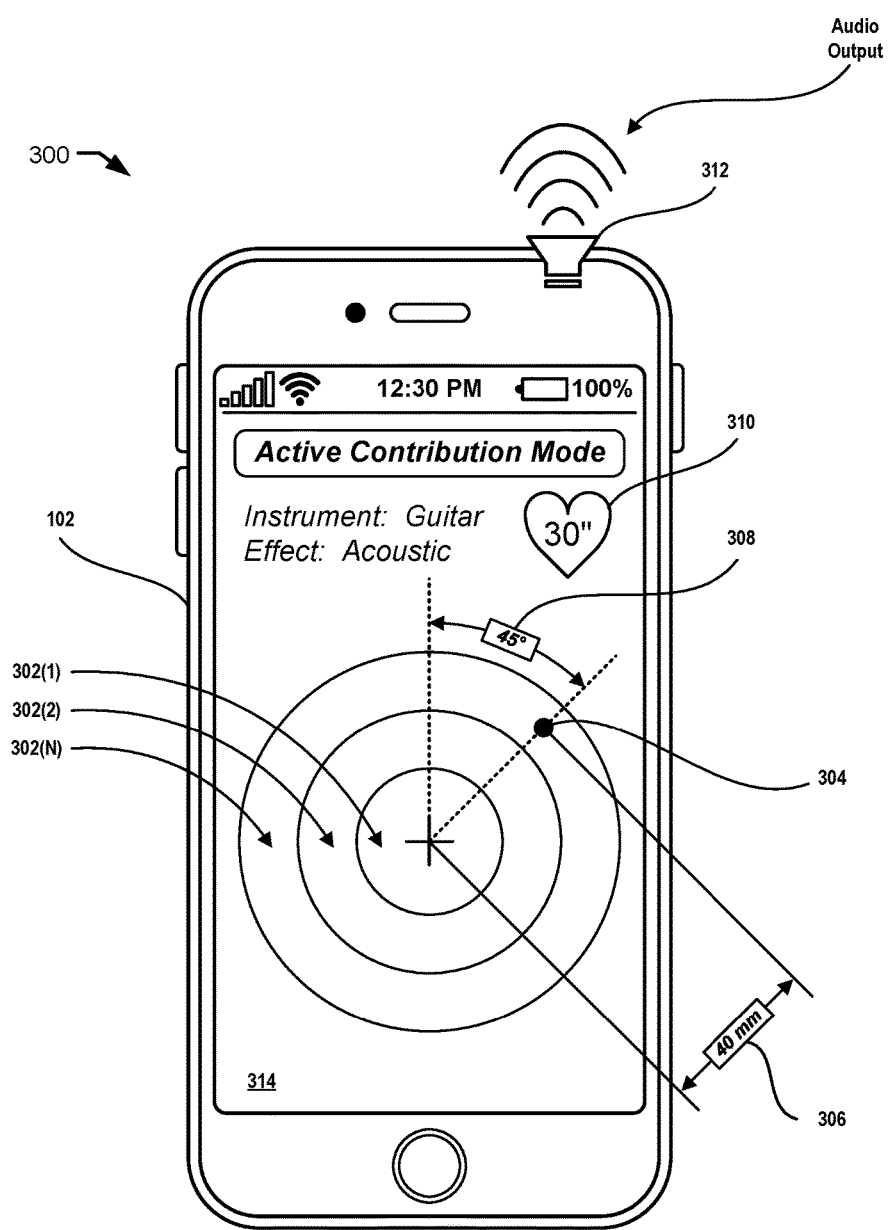
FIG. 3 illustrates an exemplary contribution graphical user interface (GUI) that enables a participant of a digital collaboration session to use a client device as an instrument during the digital collaboration session.

Turning now to FIG. 3, illustrated is an exemplary contribution graphical user interface (GUI) 300 that enables a participant of the digital collaboration session 104 to use a client device 102 as an instrument during the digital collaboration session 104. As illustrated, the contribution GUI 300 is shown in an active contribution mode that enables a user 106 to manipulate at least one user interface (UI) element 302 to cause a speaker 312 of the client device 102 to emit an audio output in real time.

In various implementations, the client device 102 includes a touch screen display 314 to enable the user 106 to activate the UI elements 302 by simply touching the touch screen display 314. In the illustrated example, the UI elements 302 includes a first UI element 302(1) through an $N^{th}$ UI element 302(N). Individual ones of the UI elements 302 may be designed to cause the speaker 312 to emit different sounds. As a specific but non-limiting example, the first UI element 302(1) may be designed to cause the speaker 312 to emit a first sound that resembles an acoustic guitar playing a "G" chord in standard tuning, the second UI element 302(2) may be designed to cause the speaker 312 to emit a second sound that resembles an acoustic guitar playing an "A" chord, and the $N^{th}$ UI element 302(N) may be designed to cause the speaker 312 to emit an $N^{th}$ sound that resembles an acoustic guitar playing an "E" chord. In this example, the user 106 tapping the touch screen display 314 at the point 304 may cause trigger a real-time contribution of the acoustic guitar playing the "E" chord into the digital collaboration session 104.

In some implementations, the contribution GUI 300 may be designed to cause various sounds to be emitted based on one or more measurements of where and/or how the user 106 is touching the touch screen display 314. For example, as illustrated, the point 304 can be measured from a reference coordinate (illustrated as a "cross-hair" at the center of the first UI element 302(1)) of the contribution GUI 300 in terms of a distance 306, or an angle 308, or both. Thus, the contribution GUI 300 may be designed to cause emission of a first sound if the touch screen display 314 is touch at the point 304 but to emit a different sound of one or both of the distance 306 and/or angle 308 at which the user 106 touches the UI element 302 changes even slightly. Is can be appreciated therefore that during the digital collaboration session 104 the user 106 may vary the points at which the touch screen display 314 is tapped or held to directly vary (in real time) the sounds that are being contributed to the digital collaboration session 104.

In some implementations, the touch screen display 314 may be a "pressure-sensitive" touch screen display that is capable of measuring a force and/or pressure with which the user 106 is touching the UI element(s) 302. Under these circumstances the contribution GUI 300 may be designed to dynamically manage the sounds that are emitted from the speaker 312 based on the measured force and/or pressure with which the user 106 is touching the UI element(s) 302. As a specific but non-limiting example, the contribution GUI 300 may manage a volume with which the speakers 312 emit sounds based on the pressure the user 106 applies to the touch screen display 314.

In some embodiments, the contribution GUI 300 includes an "interest" UI element 310 that enables the user 106 to cause generation of the segment selection 136. For example, when a participant likes a particular segment 202 of the digital collaboration session 104, that participant can indicate an interest in that segment 202 by taping the interest UI element 310. In the illustrated example, the interest UI element 310 is a "heart" icon that the participant may tap during the digital collaboration session 104 to indicate one or more segments of interest. In some embodiments, the segment may be defined as a predetermined duration of time measured backward from when the user indicated the interest in the segment. For example, upon tapping the interest icon the system may save the immediately previous thirty ("30") seconds to provide to the interested participant. In some embodiments, the interest icon may enable the participant to indicate how long of a duration he or she is interested in. For example, the duration of interest may be dynamically determined based upon how long the participant holds a finger on the interest icon.

In some implementations, the contribution GUI 300 is designed to detect one or more input gestures to enable participants to dynamically swap out instruments and/or otherwise controllably modify what sounds are being emitted by their respective client devices during the digital collaboration session 104. For example, the contribution GUI 300 may enable the participants to perform various input gestures to quickly toggle between playing an electric guitar and an electronic synthesizer. As a more specific but nonlimiting example, an individual participant may swap left and/or right on the touch screen display 314 of their client device 102 to toggle between instruments and/or instrumental effects. With respect to the illustrated example, a user 106 may perform an upward swipe on the touch screen display 314 to change the effect from "Acoustic" to some other effect such as "electric" and may further perform a swipe-right input gesture to change the instrument from "Guitar" to some other instrument.

According to various implementations, the contribution GUI 300 may be graphically abstract in the sense that it does not resemble an instrument that corresponds to the sounds being generated by the client device 102. For example, the contribution GUI 300 may be a simple unicolor and/or multicolor geometric shape (e.g., a circle, a square, a triangle, a polygon, an oval, etc.). As the user engages (e.g. tabs or holds) various portions of the geometric shape the client device 102 responds by emitting various corresponding sounds.

As one specific but nonlimiting example, the contribution GUI 300 may be a multicolor circle that the user 106 may engage at various portions to cause a client device 102 to emit electronic guitar sounds. As used herein, the term "graphically-abstract contribution GUI" refers generally to any contribution GUI that enables a user to engage one or more graphical elements to cause a client device to emit sounds which do not intuitively correspond to the one or more graphical elements. For example, the aforementioned multicolor circle that is engageable to cause the client device to emit electronic guitar sounds can aptly be described as a graphically-abstract contribution GUI because a multicolor circle does not intuitively correspond to an electric guitar instrument.

Figure 4:
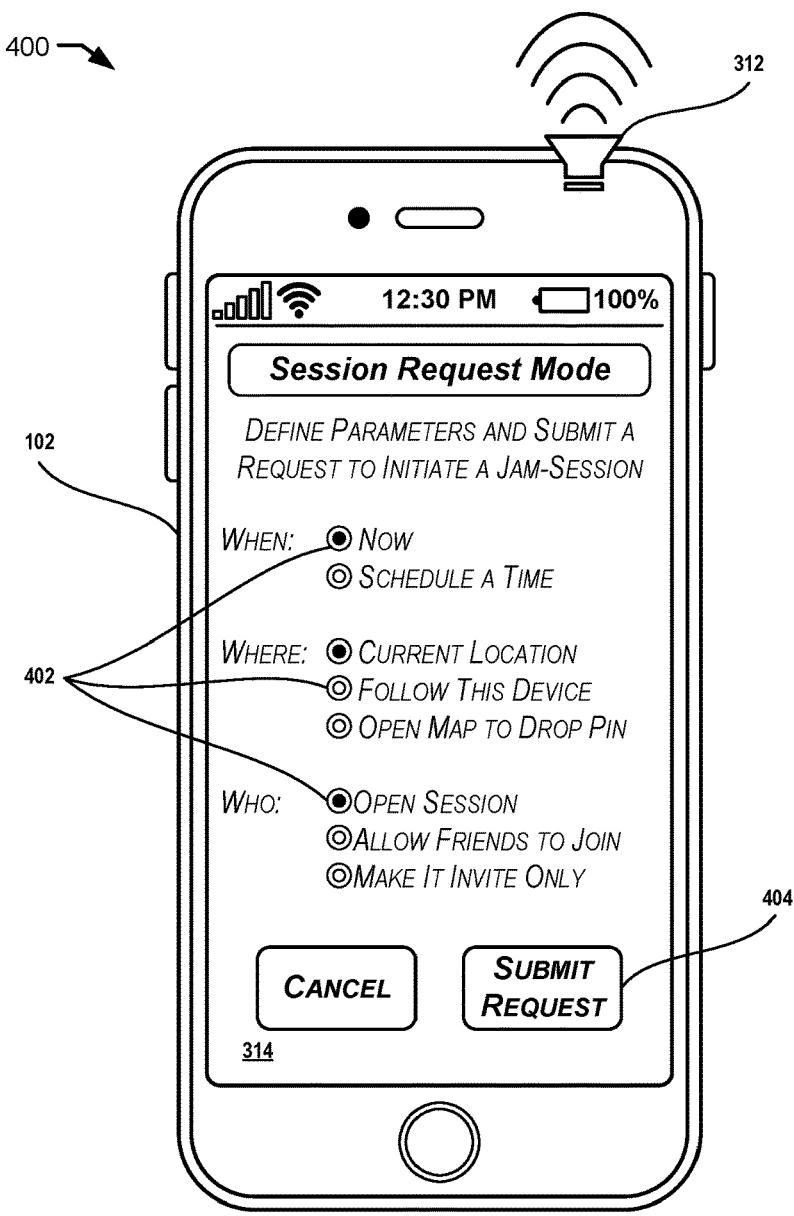
FIG. 4 illustrates an exemplary session request GUI that includes a plurality of UI elements that enable the user to define various parameters for the digital collaboration session.

Turning now to FIG. 4, illustrated is an exemplary session request GUI 400 that enables a user 106 to indicate parameters to include within the session request 130. As illustrated, the session request GUI 400 is shown to include a plurality of UI elements 402 that enable the user 106 to define various parameters for the digital collaboration session 104.

In some implementations, the session request GUI 400 enables a user 106 to define a specific time for initiation of the digital collaboration session 104. For example, as illustrated, the session request GUI 400 enables the user 106 to request that the digital collaboration session 104 be initiated immediately upon submitting the session request 130 (e.g., by selecting the "Now" UI element). Additionally, or alternatively, the session request GUI 400 may enable the user 106 to request that the digital collaboration session 104 be initiated at a predefined "scheduled" time (e.g., by selecting the "Schedule a Time" UI element which may cause a calendar icon to be exposed).

In some implementations, the session request GUI 400 enables a user 106 to define a specific location for the digital collaboration session 104. For example, as illustrated, the session request GUI 400 enables the user 106 to request that the digital collaboration session 104 be associated with a current location of the client device 102 (e.g., the client device 102 may affix its current location data 118 to the session request 130). Additionally, or alternatively, the session request GUI 400 may enable the user 106 to cause the location of the digital collaboration session 104 to be continually and/or periodically updated based on up-to-date location data 118 corresponding to the client device 102. For example, the user 106 may wish to "jam-out" within a moving vehicle on a road trip.

It can be appreciated that under these circumstances the user 106 may desire that the location of the digital collaboration session 104 is frequently updated as the client device 102 moves. Additionally, or alternatively, the session request GUI 400 may enable the user 106 to define a location for the digital collaboration session 104 from a map service. For example, selecting the "Open Map to Drop Pin" UI element may cause a local map client to open on the client device 102 to enable the user 106 to indicate where the digital collaboration session 104 is to be located. Thus, the user 106 could schedule a "jam out" session for a lunch break that will occur at some future time and define a location that the digital collaboration session will occur. In various implementations, the digital collaboration service 110 may generate and enforce a geofence 108 based on location data 118 that is manually defined by the user 106 via the session request GUI 400.

In some implementations, the session request GUI 400 enables a user 106 to indicate whom is allowed to join into the digital collaboration session 104. For example, as illustrated, the session request GUI 400 enables the user 106 to request that the digital collaboration session 104 be "open" in the sense that any other users are permitted to join (subject to other pertinent conditions such as a location with respect to the geofence 108). Additionally, or alternatively, the session request GUI 400 may enable the user 106 to limit participation in the digital collaboration session 104 to other users that are socially connected with the user and/or other participants of the digital collaboration session 104. For example, participation may be limited to other users that are "friends" with the initiating user in an online social network (e.g., FACEBOOK). Additionally, or alternatively, the session request GUI 400 may enable the user 106 to define a specific invite list for the digital collaboration session 104 and to limit participation thereto.

Figure 5:
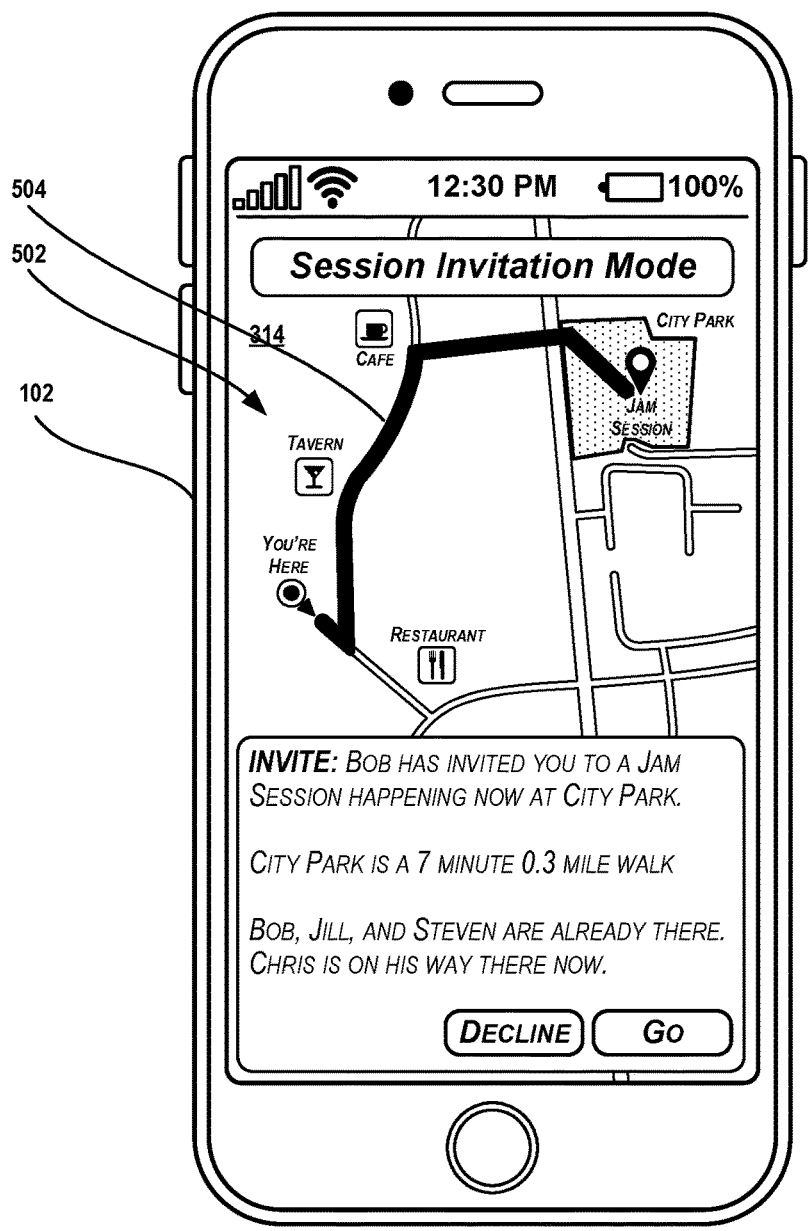
FIG. 5 illustrates a session-locator GUI that informs a recipient user of various details of a digital collaboration session.

Turning now to FIG. 5, illustrated is a session-locator GUI 500 that informs a recipient user 106 of various details of a digital collaboration session 104. As illustrated, the session notification GUI 500 is shown to inform the recipient user 106 that he or she has been invited to a particular digital collaboration session 104.

In some implementations, the session-locator GUI 500 may be configured to display a location of the digital collaboration session 104 on a map graphic 502. Additionally, or alternatively, the session-locator GUI 500 may display directions 504 to the digital collaboration session 104. For example, as illustrated, the session notification GUI 500 is shown to include a map 502 overlaid with direction 504 (illustrated as a path) and other details as to how the recipient user 106 can travel to the digital collaboration session 104 (e.g., to enter the geofence 108 and be permitted to join).

In some implementations, the session-locator GUI 500 indicates one or more locations at which one or more digital collaboration session are taking to place and/or are scheduled to take place. For example, a session-locator GUI 500 can show the map 502 which may indicate a location of and/or geofence for a specific digital collaboration session 104. The map may further indicate a current device location of the client device that is displaying the session-locator GUI 500. Accordingly, it can be appreciated that the system enables users to determine where other users are actively participating in "jam-session" and/or will soon be participating in "jam-sessions" and assists these users in meeting up with other like interested people in real world physical spaces.

Figure 6:
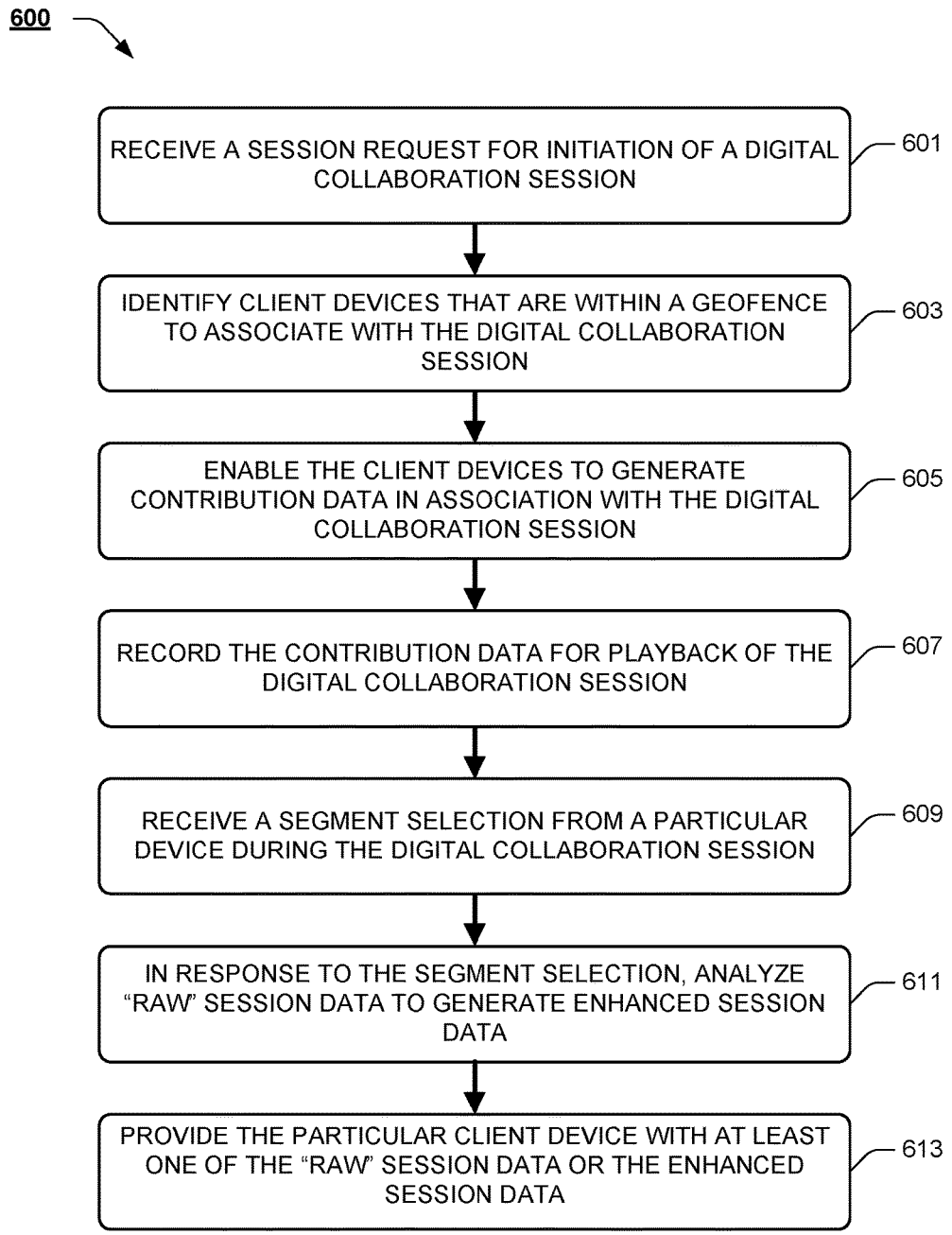
FIG. 6 illustrates a flow diagram of an example method for deploying geographically proximate client devices to facilitate digital collaboration sessions in a real-world environment.

FIG. 6 illustrates an example flow diagram. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It also should be understood that the illustrated methods can end at any time and need not be performed in their entirety. Some or all operations of the methods, and/or substantially equivalent operations, can be performed by execution of computer-executable instructions included on a computer-storage media, as defined herein. The term "computer-executable instructions," and variants thereof, as used in the description and claims, is used expansively herein to include routines, applications, application modules, program modules, programs, components, data structures, algorithms, and the like. Computer-executable instructions can be implemented on various system configurations, including single-processor or multiprocessor systems, minicomputers, mainframe computers, personal computers, hand-held computing devices, microprocessor-based, programmable consumer electronics, combinations thereof, and the like.

Turning now to FIG. 6, illustrated is a flow diagram of an example method 600 for deploying geographically proximate client devices to facilitate digital collaboration sessions within a real-world geographic area. At block 601, a computing system, such as that described below in detail with regard to FIG. 7, receives a session request 130 that requests initiation of a digital collaboration session 104. The session request 130 may define various parameters for the digital collaboration session 104 such as, for example, geofencing data 132 that defines a geofence 108 for limiting participation in the digital collaboration session 104.

At block 603, the computing system may identify client devices 102 that are within the geofence to associate with the digital collaboration session 104. For example, individual client devices 102 may transmit corresponds join request 134 for requesting to join the digital collaboration session 104. Individual join requests 134 may include location data 118 that enables the computing system to determine whether or not each client device is within the geofence.

In some implementations, the computing system may determine setlist data that defines a plurality of instrumental parameters to assign to the individual client devices to use during the digital collaboration session 104. In some implementations, the instrumental parameters may correspond to a predetermined song. For example, an organizer of the digital collaboration session 104 may indicate that participants of the digital collaboration session 104 will be striving to re-produce an existing work such as "Spoonman" by SOUNDGARDEN. In this example, the instrumental parameters may assign one client device to produce spoon sounds, another client device to produce guitar sounds, etc. In some implementations, the instrumental parameters may correspond to a predetermined music genre. In this example, the instrumental parameters may assign to the various client devices one or more instruments that are associated with the predetermined music genre. In some implementations, the instrumental parameters may correspond to a user defined distribution of instruments. In this example, a user may select from one or more available instruments (whether traditional or electronic) to cause the selected instruments to be assigned to the various client devices during the digital collaboration session 104.

At block 605, the computing system may enable the individual client devices to generate contribution data in association with the digital collaboration session 104. As described herein, manipulating a contribution GUI 300 may enable individual participants of the digital collaboration session 104 to use their respective client device as an instrument to "jam-out" with other participants in real-time. Furthermore, in various implementations, the contribution data is not indiscriminately streamed to other client devices but rather simply causes speakers 312 of the individual client devices to emit the sounds directly.

At block 607, the computing system may record the contribution data to enable playback of the digital contribution session 104. In some embodiments, the contribution data is stored on a rolling basis such that only a predetermined length of the digital collaboration session is stored at any given time. For example, under circumstances in which an interest UI element is specifically designed to indicate an interest in the immediately previous thirty seconds of the digital collaboration session, portions of the contribution data that were generated more than thirty seconds ago may be immediately and automatically discarded. It can be appreciated that the foregoing techniques reduce the non-volatile and/or volatile storage that is consumed to facilitate the digital collaboration session 104.

At block 609, the computing system may receive a segment selection from a particular client device. For example, a user that is using the particular client device to participate in the digital collaboration session 104 may tap an interest UI element 310 to indicate an interest in a particular segment of the digital collaboration session 104.

At block 611, the computing system may respond to the segment selection by analyzing "raw" session data (e.g., such as that described in relation to FIG. 2A) to generate enhanced segment data (e.g., such as that described in relation to FIG. 2B). For example, the computing system may identify one or more raw contributions that deviate from an identifiable "nominal" rhythmic pattern. Then, the computing system may modify these identified raw contributions to more closely match the identifiable "nominal" rhythmic pattern.

At block 613, the computing system may provide at least one of the "raw" session data or the enhanced session data to the particular client device from which the interest in the segment was generated. Thus, by simply tapping a UI element during the digital collaboration session 104, individual users are able to save various portions of the digital collaboration session 104 that they experienced to be pleasing or otherwise would like to save for any reason. In this way, participants are able to obtain shareable versions of impromptu jam sessions that are more polished sounding than how those impromptu jam sessions actually sounded in real-time.

Figure 7:
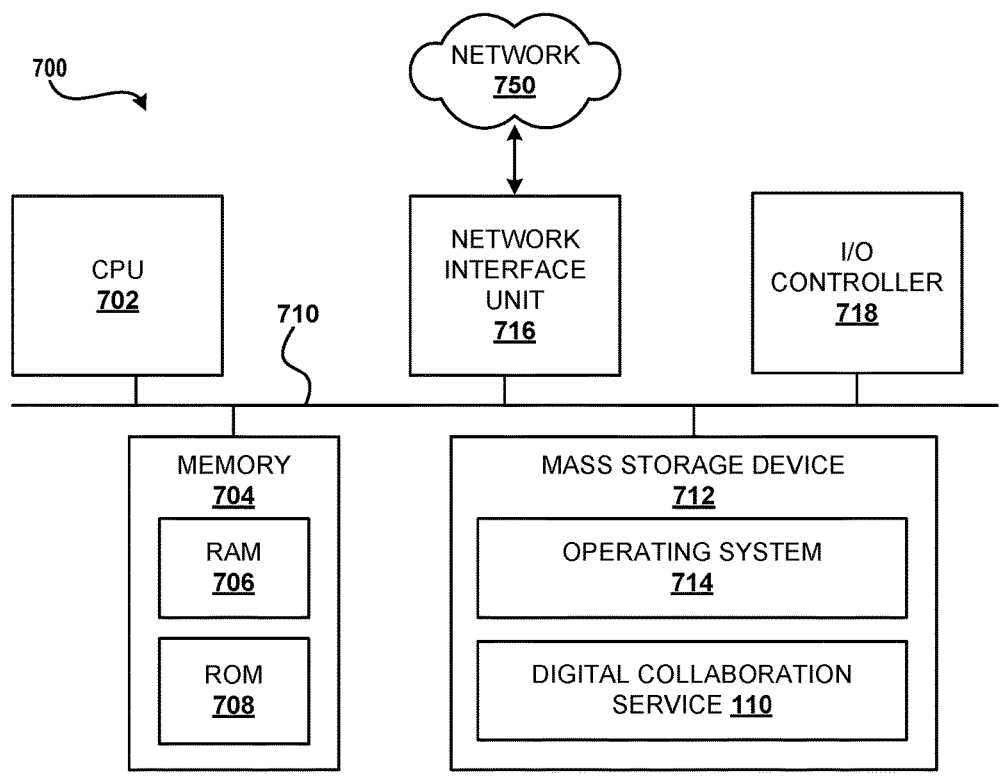
FIG. 7 shows additional details of an example computer architecture for a computer capable of executing the functionalities described herein.

FIG. 7 shows additional details of an example computer architecture for a computer capable of executing the functionalities described herein. The computer architecture 700 illustrated in FIG. 7 illustrates an architecture for a laptop computer, desktop computer, server computer, or network of server computers, or any other types of computing devices suitable for implementing the functionality described herein. The computer architecture 700 may be utilized to execute any aspects of the software components presented herein.

The computer architecture 700 illustrated in FIG. 7 includes a central processing unit 702 (CPU), a system memory 704, including a random-access memory 706 (RAM) and a read-only memory (ROM) 708, and a system bus 710 that couples the memory 704 to the CPU 702. A basic input/output system containing the basic routines that help to transfer information between elements within the computer architecture 700, such as during startup, is stored in the ROM 708. The computer architecture 700 further includes a mass storage device 712 for storing an operating system 714, other data, and one or more application programs. For example, the mass storage device 712 may include a digital collaboration service 110 that is configured to implement various functionalities and/or techniques as described herein.

The mass storage device 712 is connected to the CPU 702 through a mass storage controller (not shown) connected to the bus 710. The mass storage device 712 and its associated computer-readable media provide non-volatile storage for the computer architecture 700. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer architecture 700. For purposes of the claims, the phrase "computer storage medium," "computer-readable storage medium" and variations thereof, does not include waves, signals, and/or other transitory and/or intangible communication media, per se.

According to various techniques, the computer architecture 700 may operate in a networked environment using logical connections to remote computers through a network 750 and/or another network (not shown). The computer architecture 700 may connect to the network 750 through a network interface unit 716 connected to the bus 710. It should be appreciated that the network interface unit 716 also may be utilized to connect to other types of networks and remote computer systems. The computer architecture 700 also may include an input/output controller 718 for receiving and processing input from a number of other devices, including a keyboard, mouse, or electronic stylus (not shown in FIG. 7). Similarly, the input/output controller 718 may provide output to a display screen, a printer, or other type of output device (also not shown in FIG. 7).

It should also be appreciated that via a connection to the network 750 through a network interface unit 716, the computing architecture may enable communication with various components which perform various functionalities as described herein. For example, in some implementations, one or more functionalities as described herein may be performed as a "server-side" operation such that information is transmitted from a client device to a service that is implemented on a server.

It should be appreciated that the software components described herein may, when loaded into the CPU 702 and executed, transform the CPU 702 and the overall computer architecture 700 from a general-purpose computing system into a special-purpose computing system customized to facilitate the functionality presented herein. The CPU 702 may be constructed from any number of transistors or other discrete circuit elements, which may individually or collectively assume any number of states. More specifically, the CPU 702 may operate as a finite-state machine, in response to executable instructions contained within the software modules disclosed herein. These computer-executable instructions may transform the CPU 702 by specifying how the CPU 702 transitions between states, thereby transforming the transistors or other discrete hardware elements constituting the CPU 702.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 may include other types of computing devices, including hand-held computers, embedded computer systems, personal digital assistants, and other types of computing devices known to those skilled in the art. It is also contemplated that the computer architecture 700 may not include all of the components shown in FIG. 7, may include other components that are not explicitly shown in FIG. 7, or may utilize an architecture completely different than that shown in FIG. 7.

EXAMPLE CLAUSES

The disclosure presented herein may be considered in view of the following clauses.

Example Clause A, a computer-implemented method for deploying geographically proximate client devices to facilitate digital collaboration sessions in a real-world environment, the computer-implemented method comprising: receiving a session request that requests initiation of a digital collaboration session, wherein the session request defines a geofence for the digital collaboration session; identifying a plurality of client devices to associate with the digital collaboration session based on location data indicating that individual client devices, of the plurality of client devices, are within the geofence; causing the individual client devices to display a contribution graphical user interface (GUI) comprising a plurality of user interface (UI) elements that enable participants to generate contribution data that causes the individual client devices to emit a plurality of sounds during the digital collaboration session, wherein individual sounds of the plurality of sounds are emitted in substantially real-time responsive to generation of the contribution data; recording at least some of the contribution data to enable playback of the plurality of sounds that are emitted during the digital collaboration session; receiving, during the digital collaboration session, a segment selection that indicates an interest in at least a segment of the digital collaboration session; and in response to the segment selection, generating enhanced session data that enables playback of an enhanced version of the segment of the digital collaboration session.

Example Clause B, the computer-implemented method of Example Clause A, wherein the segment of the digital collaboration session is defined by a predetermined duration of time that is measured backward from a moment at which the segment selection is generated.

Example Clause C, the computer-implemented method of any one of Example Clauses A through B, wherein generating the enhanced session data comprises: determining at least one rhythmic pattern that corresponds to the segment that is indicated by the segment selection; and modifying, based on the at least one rhythmic pattern, a timing between one or more individual contributions that occur during the segment.

Example Clause D, the computer-implemented method of Example Clause C, wherein generating the enhanced session data further comprises: receiving, from the individual client devices, individual portions of the contribution data that correspond to the segment of the digital collaboration session; and combining the individual portions of the contribution data into a merged-track that enables playback of the enhanced version of the segment.

Example Clause E, the computer-implemented method of any one of Example Clauses A through D, wherein identifying the plurality of client devices to associate with the digital collaboration session comprises: receiving, from the plurality of client devices, a plurality of join requests that request an ability to participate in the digital collaboration session, individual join requests indicating whether a corresponding individual client device is within the geographic boundary.

Example Clause F, the computer-implemented method of any one of Example Clauses A through E, further comprising: receiving, during the digital collaboration session, an indication that a particular client device of the plurality of client devices has exited the geographic boundary; and responsive to the indication, terminating an ability to participate in the digital collaboration session using the particular client device.

Example Clause G, the computer-implemented method of any one of Example Clauses A through F, further comprising: causing a particular client device to display a session-locator GUI that indicates a location that corresponds to the geofence; and monitoring a device location of the particular client device with respect to the geofence to determine when to grant a join request that requests an ability to participate in the digital collaboration session using the particular client device.

Example Clause H, the computer-implemented method of any one of Example Clauses A through G, further comprising: determining setlist data that defines a plurality of instrumental parameters corresponding to at least one of a predetermined song, a predetermined music genre, or a user defined distribution of instruments; and assigning individual instrumental parameters, of the plurality of instrumental parameters, to the individual client devices.

Example Clause I, a system, comprising: at least one processor; and at least one memory in communication with the at least one processor, the at least one memory having computer-readable instructions stored thereupon that, when executed by the at least one processor, cause the at least one processor to: receive a session request that request initiation of a digital collaboration session and defines a geofence to limit participation in the digital collaboration session; receive location data that indicates that each of a plurality of client devices are located within the geofence; based on the location data, enable individual client devices of the plurality of client devices to display a contribution graphical user interface (GUI) that enables generation of contribution data in association with the digital collaboration session; receive, from a particular client device during the digital collaboration session, a segment selection that indicates an interest in a segment of the digital collaboration session; and provide session data to the particular client device in in response to the segment selection, wherein the session data enables playback of the segment of the digital collaboration session.

Example Clause J, the system of Example Clause I, wherein the session data is enhanced session data that enables playback of an enhanced version of the segment of the digital collaboration session.

Example Clause K, the system of any one of Example Clauses I through J, wherein the computer-readable instructions further cause the at least one processor to: analyze the contribution data to identify one or more raw contributions that deviate with respect to at least one of: a nominal beat, a nominal contribution spacing, or a nominal pitch; and generate the enhanced session data by modifying the one or more raw contributions.

Example Clause L, the system of any one of Example Clauses I through K, wherein the computer-readable instructions further cause the at least one processor to: receive individual portions of the contribution data in response to the segment selection; and combine the individual portions into a merged-track that enables playback of at least one of the segment of an enhanced version of the segment.

Example Clause M, the system of any one of Example Clauses I through L, wherein the geofence is determined based on a location of one or more of the individual client devices.

Example Clause N, the system of any one of Example Clauses I through M, wherein the segment selection is generated in response to a user input that is received via an interest user interface (UI) element of the contribution GUI.

Example Clause O, the system of Example Clause N, wherein a duration of the segment is determined based on a length of time that the user input is being received via the interest UI element.

Example Clause P, a computer-implemented method comprising: receiving a session request that requests initiation of a digital collaboration session; associating a plurality of client devices with the digital collaboration session based on join requests received from individual client devices of the plurality of client devices; causing the individual client devices to display a contribution graphical user interface (GUI) that facilitates generation of contribution data to cause the individual client devices to emit corresponding sound in real-time; receiving, from a particular client device during the digital collaboration session, a segment selection that indicates an interest in a particular segment of the digital collaboration session; and in response to the segment selection, providing session data to the particular client device to enable the particular client device to re-play the segment of the digital collaboration session.

Example Clause Q, the computer-implemented method of Example Clause P, wherein the session data is enhanced session data that enables playback of an enhanced version of the segment for which one or more raw contributions have been altered with respect to at least one of: a nominal beat, a nominal contribution spacing, or a nominal pitch.

Example Clause R, the computer-implemented method of claim of Example Clause Q, further comprising: receiving individual portions of the contribution data in response to the segment selection; and combining the individual portions into a merged-track that enables playback of the enhanced version of the segment.

Example Clause S, the computer-implemented method of any one of Example Clauses P through R, wherein the contribution data is generated via a first user input that is received via a first user interface (UI) element of the contribution GUI, and wherein the segment selection is generated via a second user input that is received via a second UI element of the contribution GUI.

Example Clause T, the computer-implemented method any one of Example Clauses P through S, wherein the session request defines a geofence for limiting participation in the digital collaboration session.

CONCLUSION

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computer-implemented method for deploying geographically proximate client devices to facilitate digital collaboration sessions in a real-world environment, the computer-implemented method comprising:
   receiving a session request that requests initiation of a digital collaboration session, wherein the session request defines a geofence for the digital collaboration session;
   identifying a plurality of client devices to associate with the digital collaboration session based on location data indicating that individual client devices, of the plurality of client devices, are within the geofence;
   causing the individual client devices to display a contribution graphical user interface (GUI) comprising a plurality of user interface (UI) elements that enable participants to generate contribution data that causes the individual client devices to emit a plurality of sounds during the digital collaboration session, wherein individual sounds of the plurality of sounds are emitted in substantially real-time responsive to generation of the contribution data;
   recording at least some of the contribution data to enable playback of the plurality of sounds that are emitted during the digital collaboration session;
   receiving, during the digital collaboration session, a segment selection that indicates an interest in at least a segment of the digital collaboration session; and
   in response to the segment selection, generating enhanced session data that enables playback of an enhanced version of the segment of the digital collaboration session.

2. The computer-implemented method of claim 1, wherein the segment of the digital collaboration session is defined by a predetermined duration of time that is measured backward from a moment at which the segment selection is generated.

3. The computer-implemented method of claim 1, wherein generating the enhanced session data comprises:
   determining at least one rhythmic pattern that corresponds to the segment that is indicated by the segment selection; and
   modifying, based on the at least one rhythmic pattern, a timing between one or more individual contributions that occur during the segment.

4. The computer-implemented method of claim 3, wherein generating the enhanced session data further comprises:
   receiving, from the individual client devices, individual portions of the contribution data that correspond to the segment of the digital collaboration session; and
   combining the individual portions of the contribution data into a merged-track that enables playback of the enhanced version of the segment.

5. The computer-implemented method of claim 1, wherein identifying the plurality of client devices to associate with the digital collaboration session comprises:
   receiving, from the plurality of client devices, a plurality of join requests that request an ability to participate in the digital collaboration session, individual join requests indicating whether a corresponding individual client device is within the geographic boundary.

6. The computer-implemented method of claim 1, further comprising:
   receiving, during the digital collaboration session, an indication that a particular client device of the plurality of client devices has exited the geographic boundary; and
   responsive to the indication, terminating an ability to participate in the digital collaboration session using the particular client device.

7. The computer-implemented method of claim 1, further comprising:
   causing a particular client device to display a session-locator GUI that indicates a location that corresponds to the geofence; and
   monitoring a device location of the particular client device with respect to the geofence to determine when to grant a join request that requests an ability to participate in the digital collaboration session using the particular client device.

8. The computer-implemented method of claim 1, further comprising:
   determining setlist data that defines a plurality of instrumental parameters corresponding to at least one of a predetermined song, a predetermined music genre, or a user defined distribution of instruments; and
   assigning individual instrumental parameters, of the plurality of instrumental parameters, to the individual client devices.

9. A system, comprising:
   at least one processor; and
   at least one memory in communication with the at least one processor, the at least one memory having computer-readable instructions stored thereupon that, when executed by the at least one processor, cause the at least one processor to:
      receive a session request that request initiation of a digital collaboration session and defines a geofence to limit participation in the digital collaboration session;
      receive location data that indicates that each of a plurality of client devices are located within the geofence;
      based on the location data, enable individual client devices of the plurality of client devices to display a contribution graphical user interface (GUI) that enables generation of contribution data in association with the digital collaboration session;
- receive, from a particular client device during the digital collaboration session, a segment selection that indicates an interest in a segment of the digital collaboration session; and
- provide session data to the particular client device in in response to the segment selection, wherein the session data enables playback of the segment of the digital collaboration session.

10. The system of claim 9, wherein the session data is enhanced session data that enables playback of an enhanced version of the segment of the digital collaboration session.

11. The system of claim 9, wherein the computer-readable instructions further cause the at least one processor to:
- receive individual portions of the contribution data in response to the segment selection; and
- combine the individual portions into a merged-track that enables playback of at least one of the segment of an enhanced version of the segment.

12. The system of claim 9, wherein the geofence is determined based on a location of one or more of the individual client devices.

13. The system of claim 9, wherein the segment selection is generated in response to a user input that is received via an interest user interface (UI) element of the contribution GUI.

14. The system of claim 13, wherein a duration of the segment is determined based on a length of time that the user input is being received via the interest UI element.

15. A computer-implemented method comprising:
- receiving a session request that requests initiation of a digital collaboration session;
- associating a plurality of client devices with the digital collaboration session based on join requests received from individual client devices of the plurality of client devices;
- causing the individual client devices to display a contribution graphical user interface (GUI) that facilitates generation of contribution data to cause the individual client devices to emit corresponding sound in real-time;
- receiving, from a particular client device during the digital collaboration session, a segment selection that indicates an interest in a particular segment of the digital collaboration session; and
- in response to the segment selection, providing session data to the particular client device to enable the particular client device to re-play the segment of the digital collaboration session.

16. The computer-implemented method of claim 15, wherein the contribution data is generated via a first user input that is received via a first user interface (UI) element of the contribution GUI, and wherein the segment selection is generated via a second user input that is received via a second UI element of the contribution GUI.

17. The computer-implemented method of claim 15, wherein the session request defines a geofence for limiting participation in the digital collaboration session.

* * * * *